United States Patent [19]
Dawes et al.

[11] 3,869,422
[45] Mar. 4, 1975

[54] BLEND OF POLYMERS

[75] Inventors: James Wilkinson Dawes, Clinton, Iowa; Kurt Lothar Seligman, Wilmington, Del.; Stanley George Smith, Beaumont, Tex.

[73] Assignee: E. I. du Pont de Nemours and Company, Wilmington, Del.

[22] Filed: Dec. 8, 1972

[21] Appl. No.: 313,360

[52] U.S. Cl. ............................ 260/42.47, 260/897 B
[51] Int. Cl. ........................ C08f 37/18, C08f 45/08
[58] Field of Search ....................... 260/897 B, 42.47

[56] References Cited
UNITED STATES PATENTS

| | | | |
|---|---|---|---|
| 3,410,928 | 11/1968 | Baum | 260/897 B |
| 3,418,270 | 12/1968 | Traub | 260/897 B |
| 3,422,055 | 1/1969 | Maloney | 260/897 B |

Primary Examiner—Morris Liebman
Assistant Examiner—S. L. Fox

[57] ABSTRACT

A heat-sealable composition containing 40–80 weight percent crystalline copolymers of ethylene and acrylic acid or methacrylic acid wherein the acid is present in the copolymer in amounts of from 5–15 weight percent, said acid being free of neutralizing metal ions; and 20–45 weight percent of an amorphous elastomeric copolymer of ethylene containing 20–60 weight percent propylene and, optionally, up to 10 weight percent of a nonconjugated diene.

5 Claims, No Drawings

BLEND OF POLYMERS

BACKGROUND OF THE INVENTION

This invention is directed to a novel heat-sealable polymeric composition and, more particularly, to a blend of a polymeric composition comprising a crystalline copolymer of ethylene and an $\alpha,\beta$-ethylenically unsaturated carboxylic acid, and an amorphous elastomeric copolymer of ethylene and propylene.

The art is replete with disclosures relating to blending copolymers to prepare, for example, coating adhesives for paper or to improve the impact resistance of articles fabricated from polymeric blends. Within recent years, large sheets of polymeric materials have been used for pond liners and ditch or pit liners. Due to the fact that such liners must cover large surface areas, it is not practical to form a single sheet of a size adequate to cover most areas desired to be lined. Therefore, individual sheets made of the polymeric composition are extruded, or otherwise formed, into thin sheets and a plurality of sheets are joined together in overlapping relation to increase size. Blends of polymers have been formulated to obtain a composition that can be formed into a film or sheet and in which the sheet is capable of adhering to itself, or a like sheet, upon the application of heat. However, prior to the present invention such blends of polymeric compositions in sheet or film form have not been entirely satisfactory because, among other things, after exposure to heat, e.g., sunlight or even storage, for a short time, e.g., a day, the sheets cannot be heat sealed satisfactorily, and the result is they separate when used under ordinary conditions. When the bond between sheets or films formed of such blends of polymeric compositions is broken, undesirable leakage from the film used as, for example, a pond liner occurs followed by, of course, loss of water due to ground seepage. Accordingly, there is a need in the art for a polymeric composition that can be formed into thin sheets or films in which the individual films can be firmly heat sealed to each other even after the films have been exposed to elevated temperatures, while at the same time the film is both flexible and strong at elevated temperatures.

SUMMARY OF THE INVENTION

It has now been discovered that a certain polymeric composition can be formed into thin sheets or films and, after the films have been exposed to temperatures higher than ordinary room temperature, for example, exposure to sunlight or during storage, the individual sheets can be firmly heat sealed to each other Further, the composition in film form exhibits excellent physical properties, especially tensile strength. More particularly, it has been found that a uniform blend of such heat-sealable polymeric composition comprises:

a. 40–80 weight percent crystalline copolymers of ethylene and an $\alpha,\beta$-ethylenically unsaturated carboxylic acid selected from the group consisting of acrylic acid and methacrylic acid, or mixtures thereof, wherein said carboxylic acid is present in the copolymer in amounts of about from 5–15 weight percent and said carboxylic acid is free of neutralizing metal ions, and b. 20–45 weight percent of an amorphous elastomeric copolymer of ethylene containing 20–60 weight percent propylene and up to about 10 weight percent of a nonconjugated diene.

The crystalline copolymer of the blend of the present invention contains 5–15 weight percent of acrylic acid or methacrylic acid. Both the amounts and the particular ethylenically unsaturated carboxylic acids, i.e., acrylic acid and methacrylic acid, are required to be present in the blend in order to obtain a polymeric composition that can be heat sealed even though the composition has been exposed to elevated temperatures, such as sunlight, for extended periods of time. The heat-sealable quality of the polymeric composition that remains after it has been exposed to elevated temperatures is due in large part to the presence of the carboxyl groups of acrylic acid or methacrylic acid. Preferably, methacrylic acid is used in the composition and the non-conjugated diene is, preferably, 1,4-hexadiene or 5-ethylidene-2-norbornene.

Water-impermeable thermoplastic films of the blend of polymer can be formed using conventional mixing and extrusion or calendering equipment, and the films when heat-sealed in a conventional manner in overlapping relation are especially useful as pond or ditch liners.

DETAILED DESCRIPTION OF THE INVENTION

The crystalline copolymer component of the blends of this invention is made by copolymerizing ethylene and acrylic acid and/or methacrylic acid in a standard free-radical catalyzed polymerization reaction according to well-known methods.

The amorphous elastomeric copolymer component contains from 20–60 weight percent, and preferably 22 to 45 weight percent propylene, the balance can be ethylene. Although the elastomeric component of the composition can be a copolymer of ethylene and propylene, preferably it is a terpolymer and contains up to about 10 weight percent of a nonconjugated diene. These terpolymers are of the type described, for example, in the Gladding et al. U.S. Pat. No. 3,093,621 and the Tarney U.S. Pat. No. 3,000,855. Nonconjugated dienes that can be used in the elastomeric portion of the composition are those that contain only one polymerizable double bond, such as aliphatic olefins, representative compounds of which include 1,4-hexadiene, 1,6-octadiene, or 6-methyl-1,5-heptadiene; cycloaliphatic olefins, representative compounds of which include dicyclopentadiene, 5-ethylidene-2-norbornene, and alkenyl-substituted norbornenes such as 5-(2'-butenyl)-2-norbornene. The nonconjugated dienes that are preferred to be used in the composition due to availability and overall physical properties of the resulting polymeric composition are 1,4-hexadiene and 5-ethylidene-2-norbornene.

The polymeric composition can, and usually does, contain carbon black, especially when it will be used outdoors because carbon black blocks damaging light rays and improves its strength. Generally, up to 20 weight percent carbon black is present, and usually the amount of carbon black added is from about 2 to 10 weight percent.

Crystalline polyethylene can be, and preferably is, substituted for a portion of the crystalline copolymer of ethylene and acrylic or methacrylic acid. Generally, the amount of crystalline polyethylene used in the polymer composition is up to about 20 weight percent, based on the weight of the total composition, and usually amounts of from about 10 to 15 weight percent are used. The polymeric composition containing the crystalline polyethylene will still maintain its beneficial properties, in addition to the economic advantage of lowering the cost of the composition.

The thermoplastic polymeric composition can be fabricated by conventional methods, as, for example, extrusion or calendering the blend of molten polymeric composition into a film. Film thickness can vary, but ordinarily films ranging from about 3–40 mils, and usually 10–20 mils, thick is sufficient for most purposes. Using conventional extrusion equipment, the sheets or films can be rolled into a roll to facilitate packaging. The film after exposure to elevated temperatures, e.g., 60°–100°C., can be heat-sealed by means well known in the art to form articles useful as pond liners and the like.

Heat-sealing films of the polymer composition is usually accomplished by pressing two layers of the film between a hot iron and an anvil. Other conventional sealing equipment for thermoplastic polymers can be used.

This invention is more thoroughly illustrated with the aid of the following examples. Parts and percentages where given are by weight unless indicated otherwise.

EXAMPLES

Method of Preparation

Test mixtures A, D, E, and F described in the table below were prepared by blending the listed components in the ratios indicated in an internal mixer which was preheated to 100°C. Cycle time was 5 minutes after charging of the ingredients in order to obtain good mixing. Mechanical working in the mixing process heated the components further, but maximum temperature did not exceed 200°C. The mixtures were then pressed into films between "Mylar" polyester film in a laboratory press at a platen temperature of 107°C. using 5,000 to 10,000 psi pressure for 20 to 60 seconds. This procedure produced films of about 0.020 inch thickness.

Mixes B, C, and G in the table below were prepared by tumbling the pelletized components in a conical blender for 10 to 30 minutes at ambient temperature. For use in this blender the carbon black, when present, silica (anti-blocking agent) stearamide (slip agent), and a portion of the polyethylene were masterbatched together in an internal mixer and extruded into pellet form. The pellet mixture was then fed from the blender to a blown film extruder where the resin was melted, extruded, and blown into 0.020 inch thick film. Polymer residence in the extruder ranged from 1 to 3 minutes. Melt temperature in the extruder reached approximately 220°C.

Stock Strength

As shown in the table, stock strength of the films of polymer was tested at 23°C. and at 70°C., showing that the films maintain useful strength at elevated temperatures.

Sample Aging

Portions of the individual films prepared as described above were subjected to heat treatment either in an oven or by outdoor exposure.

Oven treatment was at 60°C. for 24 hours in air.

Outdoor exposure was for 24 hours. During the exposure film temperatures were found to reach about 70°C. in direct sunlight during the middle of the day when air temperature was about 33°C.

Method of Sealing

Aged thermoplastic films described above were heat-sealed with a Sentinel Model 12AS Laboratory Sealer. Two films to be joind were placed under the air pressure operated, heated sealing bar of the Sentinel unit, which was then actuated for a specific sealing cycle. "Mylar" polyester film or glass coated cloth was normally used to prevent sticking of the sheeting candidate to the heated bar. Sealing bar temperatures ranged from 121°C. to 260°C. Time cycles varied from 2 to 6 seconds and bar pressure was varied from 20 to 50 psig.

Method for Seal Evaluation

Heat-seals prepared from the examples were evaluated by peeling the seals apart with an Instron tensile tester. Travel speed used on the Instron was 2 inches/min. Seal tensile data given hereinbelow under Seal Strength were obtained at 23°C. and 70°C. In all instances, the polymer film samples tore at the pressure indicated before the bond was broken.

TABLE

| Component | | A | B | C | D | E | F | G |
|---|---|---|---|---|---|---|---|---|
| EPDM-A | % | 35.0 | 35.0 | 35.0 | — | — | 35.0 | 35.0 |
| EPDM-B | % | — | — | — | 35.0 | — | — | — |
| EPR | % | — | — | — | — | 35.0 | — | — |
| E/10% MAA Copolymer | % | 65.0 | 51.0 | — | 65.0 | 65.0 | 48.8 | 47.0 |
| E/15% MAA Copolymer | % | — | — | 62.9 | — | — | — | — |
| Polyethylene | % | — | 9.9 | 1.0 | — | — | 16.2 | 13.4 |
| Carbon Black | % | — | 3.0 | — | — | — | — | 3.5 |
| Silica | % | — | 1.0 | 1.0 | — | — | — | 1.0 |
| Stearamide | % | — | 0.1 | 0.1 | — | — | — | 0.1 |
| Stock Strength | | | | | | | | |
| 23°C. (100% mod.) | psi | 875 | 1025 | 850 | 430 | 645 | 855 | 875 |
| Stress-(Tensile-Break) | psi | 2250 | 2270 | 2000 | 1900 | 925 | 2280 | 2200 |
| Strain (Elong.-Break) | % | 550 | 530 | 455 | 590 | 310 | 580 | 530 |
| 70°C. (100% Mod.) | psi | 200 | 200 | 130 | — | 170 | 270 | 200 |
| Stress-(Tensile-Break) | psi | 200 | 200 | 135 | — | 190 | 290 | 210 |
| Strain (Elong.-Break) | % | 230 | 230 | 210 | — | 135 | 260 | 150 |
| Seal Strength | | | | | | | | |
| As prepared | | | | | | | | |
| peel at 23°C. | psi | 860 | 1170 | 1027 | 960 | 440 | 890 | 1000 |
| peel at 70°C. | psi | 170 | 235 | 185 | 200 | 160 | 230 | 190 |
| Heated 24 hr. at 60°C. | | | | | | | | |
| peel at 23°C. | psi | 950 | 960 | 1110 | 930 | 470 | 880 | 920 |
| peel at 70°C. | psi | 210 | 220 | 100 | 225 | 135 | 225 | 225 |
| Outdoor Aged 24 hr. | | | | | | | | |
| peel at 23°C. | psi | 765 | — | — | 700 | 495 | 950 | 1035 |
| peel at 70°C. | psi | 240 | — | 135 | 185 | 160 | 250 | 195 |

EPDM-A — 72% ethylene/25% propylene/3% 1,4-hexadiene
EPDM-B — 67.5 ethylene/27.5% propylene/4.8% ethylidene norbornene
EPR — 43% ethylene/57% propylene
E — Ethylene
MAA — Methacrylic acid Test Mix H When a copolymer of ethylene and 10 percent acrylic acid was substituted for the ethylene-methacrylic acid of Text Mix A, similar stock strength and seal strength adhesion values were obtained.

We claim:

1. A water-impermeable heat-sealable thermoplastic film of a uniform blend of a polymeric composition consisting essentially of:

a. 40–80 weight percent of a crystalline copolymer of ethylene and an $\alpha,\beta$-ethylenically unsaturated carboxylic acid selected from the group consisting of acrylic acid and methacrylic acid, or mixtures thereof, wherein said carboxylic acid is present in the copolymer in amounts of from about 5–15 weight percent, and said carboxylic acid is free of neutralizing metal ions, b. 20–45 weight percent of an amorphous elastomeric copolymer of ethylene containing 20–60 weight percent propylene and up to about 10 weight percent of a nonconjugated diene.

2. The film of claim 1 wherein the carboxylic acid is methacrylic acid.

3. The film of claim 2 wherein the nonconjugated diene is 1,4-hexadiene or 5-ethylidene-2-norbornene.

4. The film of claim 3 wherein up to 20 weight percent of the crystalline copolymer is polyethylene.

5. The film of claim 2 containing carbon black.

* * * * *